(12) United States Patent
Mohri et al.

(10) Patent No.: US 6,524,549 B1
(45) Date of Patent: *Feb. 25, 2003

(54) METHOD FOR PRODUCING α-ALUMINA POWDER

(75) Inventors: Masahide Mohri, Ibaraki (JP); Norio Matsuda, Ibaraki (JP); Shinichiro Tanaka, Ibaraki (JP); Yoshio Uchida, Ibaraki (JP); Yoshinari Sawabe, Ibaraki (JP); Hisashi Watanabe, Ibaraki (JP); Hiroshi Ogawa, Ibaraki (JP)

(73) Assignee: Sumitomo Chemical Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1230 days.

(21) Appl. No.: 08/730,217

(22) Filed: Oct. 15, 1996

Related U.S. Application Data

(63) Continuation of application No. 08/348,907, filed on Nov. 25, 1994, now abandoned.

(30) Foreign Application Priority Data

| Nov. 25, 1993 | (JP) | 5-321165 |
| Nov. 25, 1993 | (JP) | 5-321167 |
| Nov. 25, 1993 | (JP) | 5-321168 |
| Nov. 30, 1993 | (JP) | 5-299998 |

(51) Int. Cl.$^7$ .................................................. C01F 7/00

(52) U.S. Cl. .................................................. 423/625

(58) Field of Search .................... 423/133, 625, 423/111

(56) References Cited

U.S. PATENT DOCUMENTS

| 811,433 A | * 1/1906 | Pechiney ............... 423/111 |
| 2,961,297 A | 11/1960 | Fenerty ............... 423/132 |
| 3,442,606 A | * 5/1969 | Hrishikesan ............ 423/133 |

(List continued on next page.)

FOREIGN PATENT DOCUMENTS

| CA | 678220 | * 1/1964 | ............. 423/625 |
| EP | A0105025 | 4/1984 | |
| JP | B47 46274 | 11/1972 | |
| JP | B48 13832 | 5/1973 | |
| JP | A59097528 | 6/1984 | |
| JP | A60131825 | 7/1985 | |
| JP | A63303809 | 12/1988 | |
| JP | A3131517 | 6/1991 | |
| JP | A3294436 | 12/1991 | |
| JP | A4198014 | 7/1992 | |
| JP | B5030768 | 5/1993 | |
| WO | WO 90-15777 | 12/1990 | |

OTHER PUBLICATIONS

Chemical Abstracts, vol. 99, No. 24, 1983, Abstract No. 197304, No Month.

62th CATSJ Meeting Abstracts: No. 2D105, No Date.

Primary Examiner—Steven Bos
(74) Attorney, Agent, or Firm—Sughrue Mion, PLLC

(57) ABSTRACT

Alpha alumina powder having a regulated particle size, a uniform particle shape and a narrow particle size distribution and further a low halogen content is produced by calcining at least one starting material selected from transition alumina and alumina compounds in a halogen-containing atmosphere which comprises a hydrogen halide gas, a halogen gas or a mixture of a halogen gas and steam and contains at least 0.1% by volume of at least one halogen-containing gas selected from the group consisting of hydrogen halide gas and halogen gas, and removing halogen from a calcined material. The produced alpha-alumina powder is excellent in a packing property and homogeneously packed.

12 Claims, 3 Drawing Sheets

U.S. PATENT DOCUMENTS

| | | | |
|---|---|---|---|
| 3,950,507 A | * 4/1976 | Kuklina et al. | 423/625 |
| 3,961,036 A | * 6/1976 | Hamner et al. | 423/628 |
| 4,018,881 A | * 4/1977 | Mattox | 423/631 |
| 4,130,402 A | * 12/1978 | Schepers et al. | 423/625 |
| 4,308,088 A | * 12/1981 | Cherdron et al. | 423/625 |
| 4,477,427 A | * 10/1984 | Matyasi et al. | 423/628 |
| 4,548,795 A | * 10/1985 | Andrews et al. | 423/126 |
| 4,634,581 A | * 1/1987 | Cambridge et al. | 423/126 |
| 4,822,592 A | 4/1989 | Misra | 423/625 |
| 5,149,520 A | * 9/1992 | Sucech et al. | 423/628 |
| 5,302,368 A | * 4/1994 | Harato et al. | 423/628 |
| 5,340,781 A | * 8/1994 | Oda et al. | 423/625 |
| 5,538,709 A | * 7/1996 | Mohri et al. | 423/625 |

\* cited by examiner

METHOD FOR PRODUCING α-ALUMINA POWDER

This is a Continuation of application Ser. No. 08/348,907 filed Nov. 25, 1994, now abandoned.

BACKGROUND OF THE INVENTION

1. Field of the Invention

The present invention relates to a method for producing α-alumina powder. In particular, the present invention relates to a method for producing α-alumina powder having regulated particle size and particle shape, a narrow particle size distribution and a low halogen content, and α-alumina powder produced by such method.

2. Description of the Related Art

Alpha-alumina powder is widely used as a raw material of an abrasive, a sintered body, and the like, and various production methods thereof are known. But, such conventional methods have the following drawbacks.

For example, a method disclosed in Japanese Patent KOKAI Publication No. 131517/1991 (a flux method) produces only particles of α-alumina powder which have a hexagonal close-packed lattice and a particle shape of a hexagonal plate having a ratio D/H of 5 to 40 in which D is the maximum particle size in a direction parallel to the hexagonal lattice plane and H is a particle size in a direction perpendicular to the hexagonal lattice plane, and this method also has a problem that the shape of the particle is not uniform.

Alpha-alumina powder produced by a method disclosed in GB Patent No. 990,801 and German Patent No. 1,767,511 has a non-uniform particle shape and a wide particle size distribution. Alpha-alumina powder produced by a method disclosed in Japanese Patent Publication No. 8929/1968 contains less impurity but has a wide particle size distribution.

A method disclosed in Japanese Patent Publication No. 22886/1982 makes it possible to control the particle size of α-alumina powder by the addition of corundum as a seed crystal. However, this production method is not effective industrially, since it requires a high pressure and a long time.

A method disclosed in Japanese Patent KOKAI Publication No. 97528/1984 can produce α-alumina powder having an average particle size of 1 to 10 μm and a shape with the D/H ratio of about 1, but α-alumina powder contains remaining boron or fluorine which is used as a mineralizer in the production method and includes many agglomerates which are formed in a sintering step.

As described above, the known methods have a drawback that the produced α-alumina powder has a low packing property and cannot be homogeneously packed since the control of the particle size of the produced α-alumina powder is difficult, the particle shape is nonuniform, α-alumina powder includes many agglomerated particles which are polycrystal, or α-alumina powder has the wide particle size distribution.

SUMMARY OF THE INVENTION

An object of the present invention is to provide α-alumina powder which does not have the drawbacks of the conventional production method and a method for producing such α-alumina powder.

As a result of the extensive study, it has been found that, when transition alumina or an alumina compound is calcined in an atmosphere containing at least 0.1% by volume of halogen, a particle size and shape of the produced α-alumina powder are well controlled and α-alumina powder having a narrow particle size distribution is obtained and that subsequent dehalogenation provides α-alumina powder having good properties and a low halogen content.

The produced α-alumina powder is found to be advantageously used as a raw material of a high purity sintered body, an abrasive, a raw material of a porous material such as a ceramic filter, a raw material of a single crystal, and so on, since it has a high packing property, can be homogeneously packed and has a low halogen content.

Accordingly, the present invention provides a method for producing α-alumina powder comprising the steps of calcining at least one starting material selected from transition alumina and alumina compounds in a halogen-containing atmosphere which comprises a hydrogen halide gas, a halogen gas or a mixture of a halogen gas and steam and contains at least 0.1% by volume of at least one halogen-containing gas selected from the group consisting of hydrogen halide gas and halogen gas, and removing halogen from a calcined material.

Further, the present invention provides α-alumina powder comprising particles which have a hexagonal close-packed lattice having a polyhedron shape with at least 8 faces, a D/H ratio of from 0.5 to 3.0 where D is the maximum particle size in a direction parallel to the hexagonal lattice plane and H is a particle size in a direction perpendicular to the hexagonal lattice plane, a $D_{90}/D_{10}$ ratio of 10 or less where $D_{10}$ and $D_{90}$ are particle sizes at 10% and 90% accumulation, respectively from the smallest particle size, and a halogen content of 40 ppm or less.

DETAILED DESCRIPTION OF THE INVENTION

Figure 1:
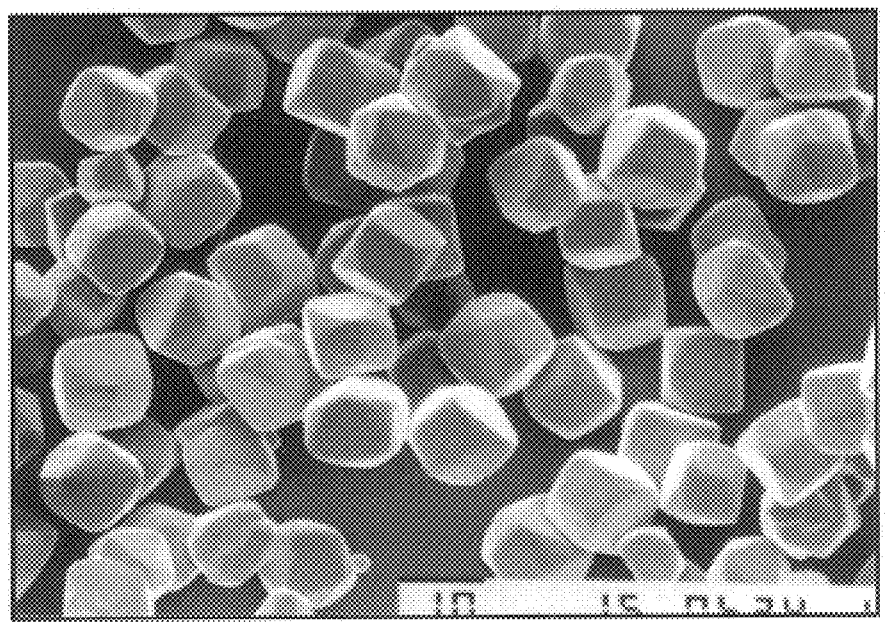
FIG. 1 is a scanning electron microscopic photograph (x 900) of the α-alumina powder produced in Example 1.

The present invention will be explained in detail.

As a starting material in the production method of the present invention, transition alumina, an alumina compound or a mixture thereof is used. If necessary, a seed crystal, a shape-regulating agent or a mixture thereof can be added to the starting material.

The transition alumina used herein is intended to mean any alumina having a polymorph represented by $Al_2O_3$ except α-alumina. Specific examples of the transition alumina are γ-alumina, δ-alumina, θ-alumina, and so on.

Examples of the alumina compound to be used as a starting material are aluminum hydroxide, aluminum sulfate, alum such as potassium aluminum sulfate and ammonium aluminum sulfate, ammonium aluminum carbonate, precursors of transition aluminas such as alumina gel which is obtained from aluminum by a submarine discharge method, and so on.

A preparation method of the transition alumina or the alumina compound is not limited. They may be prepared by any of conventional methods such as heat treatment of aluminum hydroxide, decomposition of aluminum sulfate, decomposition of alum, gas phase decomposition of aluminum chloride, decomposition of ammonium aluminum carbonate, a Bayer process, hydrolysis of an organic aluminum compound, a method using, as a raw material, an etching waste liquid recovered in a production of capacitors, and the like.

By the method of the present invention, it is possible to obtain desired α-alumina powder from aluminum hydroxide or transition alumina having a particle size of 10 μm or larger which is produced by an economical industrial method such as the Bayer process.

In the present invention, the particle size of α-alumina powder can be controlled by the addition of the seed crystal.

When any seed crystal is not added, α-alumina powder having a particle size of 0.1 to 30 μm is obtained. In such case, the particle size can be controlled by the selection of the starting material to some extent.

For example, when aluminum hydroxide which is prepared by hydrolyzing the organic aluminum compound is used as a starting material, α-alumina powder having a particle size of about 18 μm is obtained. When a transition alumina which is prepared by calcining above aluminum hydroxide is used as a starting material, α-alumina powder having a particle size of about 10 μm is obtained. Further, the particle size of α-alumina powder can be changed by selecting hydrolysis conditions, a calcining temperature, a calcining atmosphere and the like. For example, when a transition alumina which is prepared at a high calcining temperature is used as a starting material, obtained α-alumina powder has a small particle size.

When the seed crystal is added, α-alumina powder having a particle size of 0.1 to 10 μm is obtained. In this case, the particle size is controlled by changing an amount of the seed crystal. As the amount of the seed crystal increases, the particle size decreases.

An amount of the seed crystal to be added is usually from $10^{-3}$ to 50 parts by weight, preferably from $10^{-3}$ to 30 parts by weight, more preferably from $10^{-3}$ to 10 parts by weight per 100 parts by weight of the starting material an amount of which is reduced to alumina. The amount of alumina herein used is intended to mean a net amount of alumina after subtracting a weight of absorbed water or crystal water which may be contained in the starting material transition alumina or aluminum hydroxide.

The seed crystal is intended to mean a crystal which functions as a growing site for the crystal growth of α-alumina powder. Any seed crystal can be used insofar as α-alumina powder can grow around it. Specific examples of the seed crystal are compounds such as oxides, nitrides, oxynitrides, carbides, carbonitrides, halides and borides of aluminum, titanium, vanadium, chromium, iron, nickel, etc. Among them, the oxides and nitrides are preferred. In particular, the oxides are preferably used.

These metal compounds may be used independently or as a mixture of two or more of them.

To add the seed crystal, various methods such as stirring, ball milling, ultrasonic dispersing, and the like can be used. Instead of the addition of seed crystal, abraded particles from a material of a mixing apparatus may be used to control the particle size of α-alumina powder. For example, when alumina balls are used in the ball mill, abraded particles of alumina are mixed as the seed crystal in the starting, material to control the particle size of α-alumina powder.

To regulate the particle shape of α-alumina powder, a shape-regulating agent is preferably added to the starting material, namely, the transition alumina, the alumina compound or the mixture thereof.

The shape-regulating agent functions during the growth of α-alumina crystal to regulate the D/H ratio and crystal habit. Any material having such function can be used.

Examples of the shape-regulating agent are single metals such as magnesium, calcium, strontium, yttrium, zirconium, niobium, vanadium, molybdenum, copper, zinc, boron, silicon, lanthanum, cerium, neodymium, etc., and compounds of these metals such as oxides, nitrides, oxynitrides, carbides, carbonitrides, halides, borides, etc. Among them, the oxides are preferred.

The single metals and the metal compounds may be used independently or as a mixture of two or more of them.

Vanadium functions as the seed crystal also.

An amount of the shape-regulating agent is usually from $10^{-3}$ to 50 parts by weight, preferably from $10^{-3}$ to 30 parts by weight, more preferably from $10^{-3}$ to 10 parts by weight per 100 parts by weight of the starting material an amount of which is reduced to alumina.

As the shape-regulating agent which increases the D/H ratio, there is used magnesium, calcium, silicon, copper, molybdenum, niobium, zinc, zirconium, vanadium or strontium.

As the shape-regulating agent which decreases the D/H ratio, there is used lanthanum, cerium or neodymium.

When the crystal habit is to be controlled, as the shape-regulating agent for forming the n face, there is used lanthanum, cerium, neodymium or zirconium. To form the α-alumina particle having the c and r faces, calcium is used. To disappear the a face, zirconium is used. To form a hexagonal cylinder having the a and c faces, boron is used.

To add the shape-regulating agent, various methods such as ball milling, ultrasonic dispersing, and the like can be used. Alternatively, abraded particles from a material a mixing apparatus such as a mixing medium may be used as the shape-regulating agent.

To regulate the particle size and shape of α-alumina powder, the seed crystal and the shape-regulating agent are added at the same time. Thereby, α-alumina powder having a primary particle size and a particle shape which are suitable for an intended use can be produced.

When the seed crystal and the shape-regulating agent are added at the same time, a total amount of them is usually from $10^{-3}$ to 50 parts by weight, preferably from $10^{-3}$ to 30 parts by weight, more preferably from $10^{-3}$ to 10 parts by weight per 100 parts by weight of the starting material an amount of which is reduced to alumina.

The calcination of the raw material is carried out in an atmosphere containing the hydrogen halide gas, halogen gas and a mixture of halogen gas and steam.

When the hydrogen halide is used in the sintering step, a concentration of the hydrogen halide is at least 0.1% by volume, preferably at least 0.5% by volume, more preferably at least 1% by volume based on the whole volume of the atmosphere gas. To dilute the hydrogen halide, nitrogen, hydrogen, an inert gas such as argon, or an air can be used.

A pressure of the atmosphere gas containing the hydrogen halide is usually an atmospheric pressure, while it can be freely selected in an industrially used range. By calcining the starting material in such atmosphere gas, desired α-alumina powder is produced at a relatively low temperature.

A calcining temperature is usually from 500 to 1400° C., preferably from 600 to 1300° C., more preferably from 800 to 1200° C.

When the halogen gas is used in the sintering step, it is used in a concentration of at least 0.1% by volume, preferably at least 0.5% by volume, more preferably at least 1% by volume based on the whole volume of the atmosphere gas. To dilute the halogen gas, nitrogen, hydrogen, an inert gas such as argon, or an air can be used.

A pressure of the atmosphere gas containing the halogen gas is usually an atmospheric pressure, while it can be freely selected in an industrially used range. By calcining the starting material in such atmosphere gas, desired α-alumina powder is produced at a relatively low temperature.

A calcining temperature is usually from 950 to 1500° C., preferably from 1050 to 1400° C., more preferably from 1100 to 1300° C.

When the mixture of the halogen gas and steam is used in the sintering step, the halogen gas is used in a concentration of at least 0.1% by volume, preferably at least 0.5% by volume, more preferably at least 1% by volume, and the steam is used in a concentration of at least 0.01% by volume, preferably at least 0.1% by volume, more preferably at least 0.5% by volume, based on the whole volume of the atmosphere gas. To dilute the halogen gas, nitrogen, hydrogen, an inert gas such as argon, or an air can be used. The steam is supplied in a calcining furnace with nitrogen gas, and its volume percentage is controlled by the change of saturated steam pressure of water depending on a temperature.

A pressure of the atmosphere gas containing the mixture of the halogen gas and the steam is usually an atmospheric pressure, while it can be freely selected in an industrially used range. By calcining the starting material in such atmosphere gas, desired α-alumina powder is produced.

A calcining temperature is usually from 500 to 1400° C., preferably from 600 to 1300° C., more preferably from 800 to 1200° C.

When the starting material is calcined in the above atmosphere gas at the respective calcining temperature, α-alumina powder particles of which are hardly agglomerated and have the narrow particle distribution is produced at an industrially advantageous production rate.

The calcination is effected till the transition alumina or alumina compound grows to α-alumina crystal. The calcining time is preferably at least one minute, more preferably at least 10 minutes.

According to the method of the present invention, α-alumina powder is produced in relatively short time in comparison with the conventional methods.

A source of the atmosphere gas and a manner for supplying the atmosphere gas are not critical insofar as the atmosphere gas can be supplied to the reaction system in which the starting material such as the transition alumina is present. For example, as a source of the hydrogen halide gas or the halogen gas, a gas in a bomb is generally used, while it is possible to use a halogen compound in a solid or liquid state, which is vaporized or sublimated and supplied so that the desired atmosphere composition is achieved.

As a solid or liquid source of the hydrogen halide gas, there are exemplified a solution of a hydrogen halide such as hydrofluoric acid, hydrochloric acid and hydroiodic acid; halogen-containing compounds such as ammonium halide (e.g. ammonium fluoride, ammonium chloride, ammonium bromide and ammonium iodide); halogen-containing polymers; and so on. Among them, ammonium chloride is preferred. For example, since ammonium chloride is sublimated at about 400° C., it is mixed with the starting material or supplied in the furnace together with the starting material and sublimated to form the atmosphere containing hydrogen chloride gas. When the calcination is carried out in a batch manner using ammonium chloride, ammonium chloride is completely decomposed at the calcining temperature in the present invention to form an atmosphere comprising 33% by volume of hydrogen chloride gas, 17% by volume of nitrogen gas and 50% by volume of hydrogen gas according to molar ratios. Then, the concentration of the hydrogen chloride can be adjusted by selecting the amount of charged ammonium chloride and a volume of the furnace.

As a solid or liquid source of the halogen gas, there are exemplified solid $K_2N_2F_6 \cdot KF$, solid iodide, liquid bromide, liquid bromic acid, halogen-containing polymers, and so on. They may be used in the similar way to ammonium chloride.

As the concentration of the hydrogen halide is higher, high purity α-alumina powder can be produced at a lower calcining temperature in a shorter calcining time.

The gas can be supplied in a batch manner or a continuous manner.

A type of a calcining apparatus is not limited, and any of conventional apparatuses may be used. A furnace is preferably made of a material which is not corroded by the hydrogen halide gas or the halogen gas, and comprises a mechanism for adjusting the atmosphere.

Since the acidic gas such as the hydrogen halide gas or the halogen gas is used, the furnace is preferably an airtight one. In the industrial production, a tunnel furnace, a rotary kiln, or a pusher furnace can be used.

An apparatus used in the method of the present invention such as a crucible or a boat is preferably made of alumina, quartz, acid-resistant brick, platinum, silicon carbide, mullite, or graphite since the reaction proceeds in the acidic atmosphere.

To effectively carry out the calcination of the starting material in the industrial production, the solid or liquid hydrogen gas source and/or halogen gas source are supplied directly in the furnace and the starting material is continuously calcined in the atmosphere containing the hydrogen halide gas and/or the halogen gas.

In this case, the transition alumina and/or the alumina compound is calcined by supplying the solid or liquid hydrogen halide gas source, the solid or liquid halogen gas source or their mixture directly in the calcining furnace so as to form the atmosphere gas containing at least 1% by volume, preferably at least 5% by volume, more preferably at least 10% by volume of the hydrogen halide gas, the halogen gas or their mixture.

The halogen gas source and the steam can be supplied at the same time.

A concentration of the hydrogen halide gas or the halogen gas in the atmosphere of the calcining furnace in which the starting material is calcined is maintained in the above specified range. Then, the hydrogen halogen gas source or the halogen gas source is supplied in an amount sufficient for maintaining such concentration. There is no disadvantage in supplying the hydrogen halide gas source or the halogen gas source in an excessive amount and it is not necessary to remove the unused gas source from the furnace.

In a preferred embodiment, the solid or liquid hydrogen halide gas or halogen gas source is supplied directly in the calcining furnace. The gas source may be supplied independently or as a mixture with the alumina starting material. For example, when a continuously running furnace in which the starting material is supplied at interval such as the pusher type tunnel furnace is used, the gas source is charged in a vessel in which the alumina starting material is charged and then placed in the furnace. In this case, a gas supplying equipment which is necessary when the gas bomb is used can be neglected.

To maintain the necessary concentration of the hydrogen halide gas and/or the halogen gas in a highest temperature homogeneously heating zone of the furnace, the hydrogen halide gas and/or the halogen gas which are generated by the decomposition of the gas sources are flowed preferably in parallel with the supply direction of the transition alumina and/or the alumina compound.

To supply the hydrogen halide gas and/or the halogen gas in parallel with the supply direction of the starting material, the gas is flowed from an entrance of the starting material towards the highest temperature homogeneously heating zone by conveying the gas with the nitrogen gas, or the gas is sucked from an exit of α-alumina powder by a blower. Thereby, the concentration of the hydrogen halide or halogen gas in the furnace atmosphere can be easily maintained in the specific range in the zone where the starting material is calcined.

Herein, the highest temperature homogeneously heating zone means a zone in which the transition alumina and/or the alumina compound is reacted with the hydrogen halide gas and/or the halogen gas and calcined. In the furnace, the temperature in this zone should be kept at the highest temperature most suitable for the reaction.

The calcining temperature is usually from 600° C. to 1400° C., preferably from 700° C. to 1300° C., more preferably from 800° C. to 1200° C. When the raw material is calcined in this temperature range, the powdery α-alumina having the narrow particle size distribution just after the calcination can be produced at the industrially advantageous production rate.

The calcining time is the same as above.

While the continuous calcining furnace with which the starting material is continuously supplied and the product is continuously taken out such as the tunnel furnace or the rotary kiln is used, an electric heating type or indirect gas heating type tunnel furnace is preferably used.

In the present invention, since the starting material is calcined in the atmosphere containing the hydrogen halide gas, the halogen gas or the mixture of the halogen gas and the steam, the halogen which remains in the calcined product is removed from the product.

For example, since the fine α-alumina powder having the particle size of 1 μm or less has a large surface area, the bulk of the powder may contain 200 ppm or larger of the halogen just after calcination. Even the α-alumina powder having the particle size of several μm and a relatively large surface area may contain several ten ppm of the halogen.

When the α-alumina powder containing several hundred ppm or larger of the halogen is used, for example, as the raw material of the encapsulant, the corrosive halogen gas leaks out from the sealed IC and breaks aluminum wirings. Then, when the α-alumina powder is used in the applications in which the halogen ion will have the adverse affect such as the raw material of the high purity sintered body, the abrasive, the ceramic filter, the encapsulant or the single crystal, the halogen should be removed.

To remove the halogen, the following methods may be employed.

a) The α-alumina powder containing the halogen is heated in an atmosphere of an air or nitrogen gas which may additionally contain at least 0.1% by volume, preferably at least 1% by volume, more preferably at least 10% by weight of at least one gas selected from the group consisting of steam, oxygen, hydrogen, carbon dioxide, an alcohol and ammonia, at a temperature of from 550° C. to 1400° C., preferably from 600° C. to 1200° C., more preferably from 800° C. to 1200° C. for at least 1 minute, preferably at least 10 minutes, more preferably at least 1 hour. For example, when the remaining concentration of the halogen is reduced to 10 ppm or less for some applications, the α-alumina powder is preferably heated in the atmosphere containing at least 1% by weight of the above additional gas at a temperature of at least 800° C. for at least 30 minutes.

b) The α-alumina powder containing, the halogen is heated in an inert gas atmosphere at a temperature of from 600° C. to 1400° C., preferably from 900° C. to 1200° C. for at least 1 minute, preferably at least 30 minutes, more preferably at least 1 hour.

c) The α-alumina powder containing the halogen is heated under reduced pressure of 1 Torr or less, preferably 0.1 Torr or less at a temperature of from 400° C. to 1400° C., preferably from 700° C. to 1200° C. for at least 1 minute, preferably at least 10 minutes, more preferably at least 1 hour.

d), e) and f) The (x-alumina containing the halogen is (d) washed with water, an alkaline solution (pH of 9 to 13) or an alcohol and then dried at a temperature of from 70° C. to 300° C., (e) heated in water, an alkaline solution (pH of 9 to 13) or an alcohol to a boiling point of the liquid and dried at a temperature of 70° C. to 300° C., or (f) treated in an autoclave containing water, an alkaline solution (pH of 9 to 13) or an alcohol at a temperature of from 70° C. to 200° C. and dried at a temperature of from 70° C. to 300° C.

A kind of the alkaline solution is not limited. For example, aqueous ammonia or an aqueous solution of sodium hydroxide is used with adjusting the pH in the above range.

A kind of the alcohol is not limited. For example, methanol or ethanol is preferably used.

In the case of the treatment in the autoclave, when the treatment is carried out under the saturated vapor pressure of the solvent, the halogen can be effectively removed. To shorten the treatment time, the autoclave equipped with a pressurizing mechanism is preferably used.

Since an amount of the removed halogen is very small, a commercially available calcining furnace or autoclave can be used.

When the α-alumina powder is very fine, since a part of the particles are slightly agglomerated, it is preferable to mill the powder lightly.

The α-alumina powder may be milled lightly before or after the removal of the halogen. In the industrial scale production facility, the process can be designed in the convenient order of the steps.

The method of milling is not critical. For example, a jet mill, a vibration mill, a ball mill and the like can be used. Among them, the jet mill is preferred.

The agglomeration of the α-alumina powder produced by the method of the present invention is weak and can be dispersed by a small milling energy. For example, when the jet mill is used, the agglomerated powder of the present invention can be milled by a very low pressure of supplied air, for example, 1 to 6 kg/cm$^2$ at which the α-alumina powder produced by the conventional method cannot be sufficiently milled.

Since the α-alumina powder produced by the method of the present invention has the regulated particle size, the uniform particle shape and the narrow particle size distribution, it is excellent in a high packing property and the homogeneous packing. Further, it is distinguished by the low halogen content. In addition, the α-alumina particles of the present invention is excellent in the uniformity of the inner part of the particle, in particular, when they are produced in the absence of the seed crystal.

The α-alumina particle has the hexagonal close-packed lattice having a polyhedron shape with at least 8 faces, a D/H ratio of from 0.5 to 3.0, where D is the maximum particle size in a direction parallel to the hexagonal lattice plane and H is a particle size in a direction perpendicular to the hexagonal lattice plane, a $D_{90}/D_{10}$ ratio of 10 or less where $D_{10}$ and $D_{90}$ are particle-sizes at 10% and 90% accumulation, respectively from the smallest particle size, and the halogen content of 40 ppm or less. The α-alumina powder has a number average particle size of 0.1 to 30 μm.

Since the α-alumina powder produced by the method of the present invention has the high packing property, is homogeneously packed and has the low halogen content, it is advantageously used as a raw material of a single crystal, a raw material of a high purity sintered body, an abrasive, a raw material of a porous material such as a ceramic filter, a raw material of a encapsulant, and so on.

The $D_{90}/D_{10}$ ratio is usually 10 or less, preferably 7 or less. When this ratio is 7 or less, the α-alumina powder has the better packing property, and is preferably used as the raw material of the single crystal or encapsulant, which requires the particularly high packing property.

The halogen content is usually 40 ppm or less, preferably 20 ppm or less, more preferably 10 ppm or less. For the use as the raw material of the single crystal or high purity sintered body, the halogen content is preferably 20 ppm or less. For the use as the raw material of the encapsulant in which the corrosion problem is avoided, the halogen content is preferably 10 ppm or less.

While the alumina purity depends of the starting material, according to the method of the present invention, the α-alumina powder having the same alumina purity as or better alumina purity than that of the starting material can be produced.

The alumina purity is preferably at least 99.90%, more preferably at least 99.95%.

For the use as the raw material of the single crystal, the alumina purity is preferably at least 99.90%. For the use as the raw material of the high purity sintered body, the aluminum purity is preferably at least 99.95%. At the alumina purity of 99.95% or higher, there is no abnormal growth of the particles and the sintered body having a uniform microstructure and high strength is obtained. Then, such α-alumina powder can be used as the raw material of the single crystal which is used in an application which requires a particularly high purity, such as a solid state laser.

In particular, by the method of the present invention, since a content of impurity iron or calcium is the same as or smaller than that in the starting material so that any abnormal growth does not occur, the α-alumina powder of the present invention is preferably used as the raw material of the high purity sintered body.

The α-alumina powder can be processed by the following method and used in the above applications.

The single crystal can be produced by, for example, the Czochralski method in which a process comprising filling the raw material α-alumina powder in a crucible, heating it to the melting point to melt the powder and cooling it is repeated several times to fill the melt in the crucible, and the alumina is drawn. With this method, it is desired to reduce the number of heating and melting steps in view of the cost and contamination of impurities. To this purpose, it is preferred to increase the packing density of the raw material α-alumina powder. The α-alumina powder of the present invention is preferably used as the raw material of the single crystal, since it has the regulated particle size, the uniform particle shape and the narrow particle size distribution, and therefore it has the higher packing density than the conventional α-alumina powder.

To produce the high purity sintered body and the porous material such as the ceramic filter, the α-alumina powder of the present invention is shaped by press molding, slip casting, injection molding, extrusion, and so on, sintered and processed.

In the case of the high purity sintered body, when the powder packing in the green body is nonuniform, the body is unevenly shrunk in the sintering step so that dimensional accuracy is deteriorated. When the particle size distribution is wide and the agglomerated particles are included or the impurities are contained, the strength or wear resistance of the body is decreased. Then, for the production of the high purity sintered body, it is preferred to use the α-alumina powder of the present invention which contains no agglomerated particle and can provide the uniformly packed green body. The α-alumina powder of the present invention is preferably used in the production of the high purity sintered body since it has the uniform particle shape and the narrow particle size distribution and can be uniformly packed.

Since the porous material such as the ceramic filter is required to filtrate various materials having different particle sizes and to have a high filtration efficiency, the porous material in which a pore size can be controlled and which has a narrow pore size distribution is preferred. The α-alumina powder of the present invention is preferably used in the production of the porous material such as the ceramic filter, since it has the uniform particle shape and the narrow particle size distribution and its particle size can be regulated, so that the pore size of the porous material is regulated and the porous material such as the ceramic filter having the desired pore size can be produced.

The α-alumina powder of the present invention is mixed with an epoxy resin and used as the encapsulant which is coated on IC or LSI to improve the mechanical strength, heat resistance, durability, heat conductivity, and the like. The α-alumina powder of the present invention is preferably used as the raw material of the encapsulant, since it has the uniform particle shape and the narrow particle size distribution and is uniformly packed and further it contains only the small amount of the halogen which causes the corrosion and its purity is high.

The α-alumina powder of the present invention has a high crushing strength, and preferably used as the abrasive also.

Further, since the α-alumina powder of the present invention has the high packing property and is uniformly packed, and contains the small amount of the halogen, it can be used as the raw material of the single crystal such as YAG (yttrium-aluminum garnet), sapphire or ruby, the raw material of the high purity sintered body, the abrasive, the raw material of the ceramic filter, or the raw material of the encapsulant.

PREFERRED EMBODIMENTS OF THE INVENTION

The present invention will be illustrated by the following Examples, which do not limit the scope of the present invention in any way.

In the Examples, the measurements were carried out as follows:

1. Measurement of number average particle size and particle size distribution ($D_{90}/D_{10}$) of α-alumina powder (1) The number average particle size is obtained by selecting 80 to 100 particles from a scanning electron microscopic photograph of the α-alumina taken by the scanning electron microscope T-300 manufactured by Nippon Electron Co., Ltd. and image analyzing them to calculate an average value of equivalent circle diameters of the particles and the distribution. The equivalent circle radius is a diameter of a circle having the same area as that of the particle in the photograph.

(2) The $D90/D_{10}$ ratio is measured by a master sizer (manufactured by Malvern Instrument, Inc.) which uses a laser beam scattering method as a measurement principle. $D_{10}$ and $D_{90}$ are particle sizes at the 10% accumulation and the 90% accumulation, respectively from the smallest particle size in the accumulated particle size distribution.

2. Measurement of particle shape of α-alumina powder

Herein, the particle shape is represented by the D/H ratio where D is the maximum particle size of the α-alumina particle having the hexagonal close-packed lattice in a direction parallel to the hexagonal lattice plane and H is a particle size in a direction perpendicular to the hexagonal lattice plane.

The D/H ratio is obtained by selecting 5 to 10 particles from a scanning electron microscopic photograph of the α-alumina powder taken by the scanning electron microscope T-300, measuring the D and H, calculating the D/H ratio of each particle and averaging the D/H ratios of 5 to 10 particles.

3. Measurement of a concentration of remaining halogen

An amount of remaining halogen of 10 ppm or larger is measured by the X-ray fluorescent analysis. That is, the α-alumina powder is charged in a container having a diameter of 40 mm and irradiated by X-ray.

An amount of remaining halogen of less than 10 ppm is measured by the glow discharge mass spectroscopy. That is, the α-alumina powder is deposited on an in wire and analyzed.

4. Number of crystal faces and crystal habits (1) Number of crystal faces

A scanning electron microscopic photograph of the α-alumina powder is taken by the scanning electron microscope T-300 and image analyzed.

(2) Evaluation of crystal habits

To evaluate the particle shape of the α-alumina powder of the present invention, the crystal habit of the crystal is observed. The crystal habits A to I of the α-alumina particles obtained by the present invention are shown in FIG. 5. The crystal of α-alumina is the hexagonal system, and its crystal habit means a crystal shape characterized by the appearing ways of the crystal faces comprising the a face {1120}, the c face {0001}, the n face {2243} and the r face {1012}.

5. Measurement of alumina purity

Amounts of impurity ions are measured by the emission spectrochemical analysis, and converted to amounts of their oxides.

The halogen content is measured as above.

The alumina purity is calculated by subtracting the total impurity percentage (% by weight) from 100%.

6. Crushing strength of particles

A crushing strength of the powder particles is measured by a dynamic ultra small hardness tester (manufactured by Shimadzu Corporation).

The materials used in the Examples are as follows:

1. Transition alumina

Transition alumina prepared by hydrolyzing aluminum isopropoxide to form aluminum hydroxide and calcining aluminum hydroxide (AKP-G15 (a trade name) of Sumitomo Chemical Co., Ltd., secondary particle size of about 4 μm).

2. Aluminum hydroxide

Aluminum hydroxide powder is prepared by hydrolyzing aluminum isopropoxide and has a secondary particle size of about 8 μm.

3. Hydrogen halide gas and halogen gas

As the hydrogen halide gas, hydrogen chloride gas is used. As the hydrogen chloride gas, bomb hydrogen chloride (purity: 99.9%) supplied by Tsurumi Soda Co., Ltd. is used. As the chlorine gas, bomb chlorine gas (purity: 99.4%) supplied by Fujimoto Industries, Co., Ltd. is used.

EXAMPLE 1

The transition alumina powder (AKP-G15) (200 g) was filled in a graphite boat and calcined in a cylinder furnace having a quartz muffle. The temperature was raised at a heating rate of 500° C./hr with flowing nitrogen gas. When the temperature reached 800° C., the bomb hydrogen chloride gas was supplied using nitrogen gas as a diluent gas. A concentration of hydrogen chloride in the furnace atmosphere was controlled by adjusting flow rates of the nitrogen gas and the hydrogen chloride gas by flow meters. The total flow amount of the atmosphere gas was adjusted to a linear velocity of 20 mm/min. A total pressure of the atmosphere gas was equal to the atmospheric pressure.

After reaching 1100° C., that temperature was maintained for 30 minutes and then cooled spontaneously.

The obtained α-alumina powder was heated in the air at 600° C. for 30 minutes to remove chlorine to obtain the desired α-alumina powder.

The production conditions in Examples and Comparative Examples are shown in Table 1 and the results of the measurements are shown in Table 2.

Figure 2:
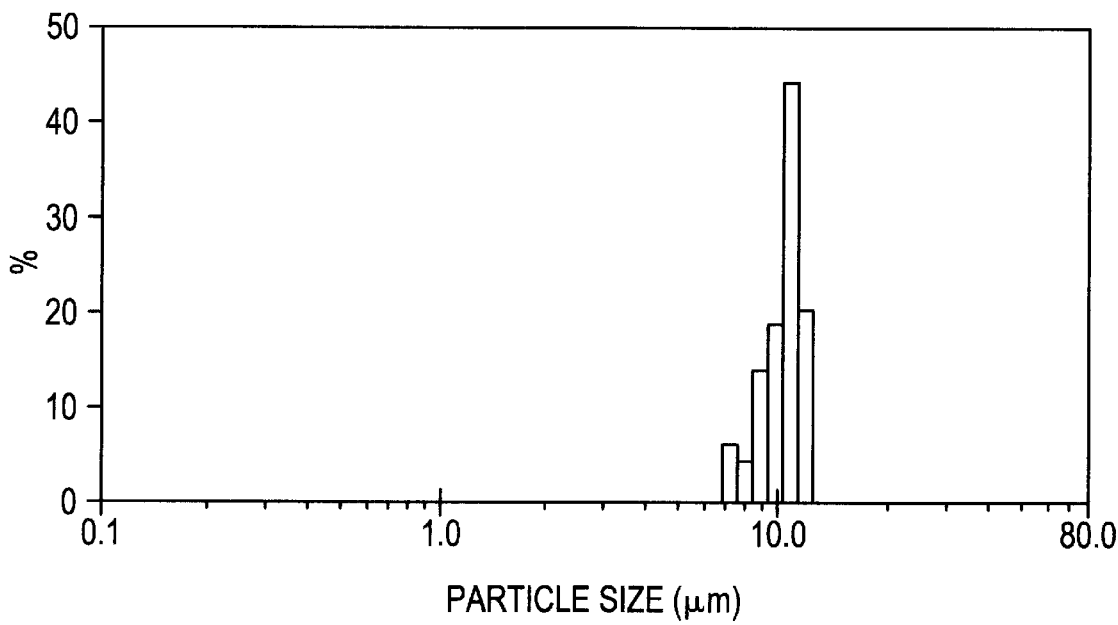
FIG. 2 shows a particle size distribution of the α-alumina powder produced in Example 1.

FIG. 1 is a scanning electron microscopic photograph of the α-alumina powder produced in Example 1, and FIG. 2 is a graph showing the particle size distribution of the α-alumina powder produced in Example 1.

EXAMPLE 2

In the same manner as in Example 1 except that, as the starting alumina, aluminum hydroxide which was prepared by hydrolyzing an organic aluminum compound was used, α-alumina powder was produced. The results are shown in Table 2.

The particles had the crushing strength of 580 kg/mm².

EXAMPLE 3

In the same manner as in Example 1 except that, as the transition alumina, alum (manufactured by WAKO JUNYAKU) was used, α-alumina powder was produced. The results are shown in Table 2.

EXAMPLE 4

In the same manner as in Example 1 except that, as the transition alumina, aluminum sulfate (manufactured by WAKO JUNYAKU) was used, α-alumina powder was produced. The results are shown in Table 2.

EXAMPLE 5

The transition alumina (AKP-G15) (200 g) and, as a seed crystal, α-alumina powder (AKP-50 (trade name) manufactured by Sumitomo Chemical Co., Ltd.) (11.6 g) were mixed and filled in the graphite boat. Thereafter, in the same manner as in Example 1, α-alumina was produced. The results are shown in Table 2.

EXAMPLE 6

The α-alumina powder obtained in Example 5 was milled in a jet mill (PJM-100SP manufacture by Nippon Pneumatic Industries Co., Ltd.) under air pressure of 6 kg/cm$^2$ at a powder supply rate of 2.4 kg/hr. The results are shown in Table 2.

The contents of Fe and Ca were 7 ppm and 4 ppm, respectively.

EXAMPLE 7

The transition alumina (AKP-G15) (200 g) and, as a seed crystal, α-alumina powder (AKP-50) (11.6 g) were mixed and filled in the graphite boat. Then, under the same condition as that in Example 1, the mixture was calcined at 1100° C. for 30 minutes and cooled spontaneously to obtain α-alumina powder.

The obtained α-alumina powder was milled in a jet mill (PJM-100SP) under air pressure of 6 kg/cm$^2$ at a powder supply rate of 2.4 kg/hr and heated in the air at 600° C. for 30 minutes to remove chlorine to obtain desired α-alumina powder.

The results are shown in Table 2.

EXAMPLE 8

A mixture of the transition alumina powder (AKP-G15) (200 g) and, as a seed crystal, the α-alumina powder (AKP-50) (11.6 g) was filled in a graphite boat and calcined in a cylinder furnace having a quartz muffle. The temperature was raised at a heating rate of 500° C./hr with flowing nitrogen gas. When the temperature reached 400° C., only the bomb hydrogen chloride gas was supplied. A concentration of hydrogen chloride in the furnace atmosphere was controlled by adjusting flow rate of the hydrogen chloride gas by a flow meter. The flow amount of the atmosphere gas was adjusted to a linear velocity of 20 mm/min. A total pressure of the atmosphere gas was equal to the atmospheric pressure.

After reaching 600° C., that temperature was maintained for 90 minutes and then cooled spontaneously.

The obtained α-alumina powder was heated in the air at 600° C. for 30 minutes to remove chlorine and milled by the jet mill under air pressure of 6 kg/cm$^2$ at a powder supply rate of 2.4 kg/hr to obtain the desired α-alumina powder.

The results are shown in Table 2.

EXAMPLE 9

A mixture of the transition alumina powder (AKP-G15) (200 g) and, as a seed crystal, the α-alumina powder (AKP-50) (11.6 g) was filled in a graphite boat and calcined in a cylinder furnace having, a quartz muffle. The temperature was raised at a heating rate of 500° C./hr with flowing nitrogen gas. When the temperature reached 800° C., only the bomb chlorine gas was supplied. A concentration of chlorine in the furnace atmosphere was controlled by adjusting a flow rate of the chlorine gas by a flow meter. The flow amount of the atmosphere gas was adjusted to a linear velocity of 20 mm/min. A total pressure of the atmosphere gas was equal to the atmospheric pressure.

After reaching 1200° C., that temperature was maintained for 30 minutes and then cooled spontaneously.

The obtained α-alumina powder was heated in the air at 600° C. for 30 minutes to remove chlorine and milled by the jet mill under air pressure of 6 kg/cm$^2$ at a powder supply rate of 2.4 kg/hr to obtain the desired α-alumina powder.

The results are shown in Table 2.

EXAMPLE 10

A mixture of the transition alumina powder (AKP-G15) (200 g) and, as a seed crystal, the α-alumina powder (AKP-50) (11.6 g) was filled in a graphite boat and calcined in a cylinder furnace having a quartz muffle. The temperature was raised at a heating rate of 500° C./hr with flowing nitrogen gas. When the temperature reached 600° C., the bomb chlorine gas and steam were supplied using a nitrogen gas as a diluent gas. A concentration, of chlorine in the furnace atmosphere was controlled by adjusting flow rates of the chlorine gas and the nitrogen gas by flow meters. The total flow amount of the atmosphere gas was adjusted to a linear velocity of 20 mm/min. A total pressure of the atmosphere gas was equal to the atmospheric pressure.

After reaching 800° C., that temperature was maintained for 90 minutes and then cooled spontaneously.

The obtained α-alumina powder was milled by the jet mill under air pressure of 6 kg/cm$^2$ at a powder supply rate of 2.4 kg/hr and heated in the air at 600° C. for 30 minutes to remove chlorine to obtain the desired α-alumina powder.

The results are shown in Table 2.

EXAMPLE 11

A mixture of the transition alumina powder (AKP-G15) (200 g) and, as a shape-regulating agent, MgO powder (manufactured by WAKO JUNYAKU Co., Ltd.) (6 g) was filled in a graphite boat and calcined in a cylinder furnace having a quartz muffle. The temperature was raised at a heating rate of 500° C./hr with flowing nitrogen gas. When the temperature reached 800° C., the bomb hydrogen chloride gas was supplied using a nitrogen gas as a diluent gas. A concentration of hydrogen chloride in the furnace atmosphere was controlled by adjusting flow rates of the hydrogen chloride gas and the nitrogen gas by flow meters. The total flow amount of the atmosphere gas was adjusted to a linear velocity of 20 mm/min. A total pressure of the atmosphere gas was equal to the atmospheric pressure.

After reaching 1100° C., that temperature was maintained for 30 minutes and then cooled spontaneously.

The obtained α-alumina powder was heated in the air at 600° C. for 30 minutes to remove chlorine to obtain the desired α-alumina powder.

The results are shown in Table 2.

EXAMPLE 12

A mixture of the transition alumina powder (AKP-G15) (200 g), as a seed crystal, α-alumina powder (AKP-50) (6 g) and, as a shape-regulating agent, MgO powder (manufactured by WAKO JUNYAKU Co., Ltd.) (11.6 g) was filled in a graphite boat and calcined in a cylinder furnace having a quartz muffle. The temperature was raised at a heating rate of 500° C./hr with flowing nitrogen gas. When the temperature reached 800° C., the bomb hydrogen chloride gas was supplied using a nitrogen gas as a diluent gas. A concentration of hydrogen chloride in the furnace atmosphere was controlled by adjusting flow rates of the hydrogen chloride gas and the nitrogen gas by flow meters. The total flow amount of the atmosphere gas was adjusted to a linear velocity of 20 mm/min. A total pressure of the atmosphere gas was equal to the atmospheric pressure.

After reaching 1100° C., that temperature was maintained for 30 minutes and then cooled spontaneously.

The obtained α-alumina powder was milled by the jet mill under air pressure of 6 kg/cm$^2$ at a powder supply rate of 2.4 kg/hr and heated in the air at 600° C. for 30 minutes to remove chlorine to obtain the desired α-alumina powder.

The results are shown in Table 2.

EXAMPLE 13

The transition alumina (AKP-G15) (200 g) and, as a seed crystal, α-alumina powder (AKP-50) (11.6 g) were mixed and filled in the graphite boat. Then, under the same condition as that in Example 1, the mixture was calcined at 1100° C. for 30 minutes and cooled spontaneously to obtain α-alumina powder.

The obtained α-alumina powder was heated in the air at 1000° C. for 30 minutes to remove chlorine and milled in a jet mill (PJM-100SP) under air pressure of 6 kg/cm$^2$ at a powder supply rate of 2.4 kg/hr to obtain desired α-alumina powder.

The results are shown in Table 2.

EXAMPLE 14

In the same manner as in Example 13 except that the dechlorination was carried out at 900° C., α-alumina powder was produced. The results are shown in Table 2.

EXAMPLE 15

In the same manner as in Example 13, except that the dechlorination was carried out under a nitrogen atmosphere at 1100° C. for 180 minutes, α-alumina powder was produced. The results are shown in Table 2.

EXAMPLE 16

In the same manner as in Example 13 except that the dechlorination was carried out at 1000° C. for 60 minutes under pressure of 0.1 Torr which was generated by a rotary pump (GVD-050A manufactured by SHINKU KIKO Co., Ltd.), α-alumina powder was produced. The results are shown in Table 2.

Figure 3:
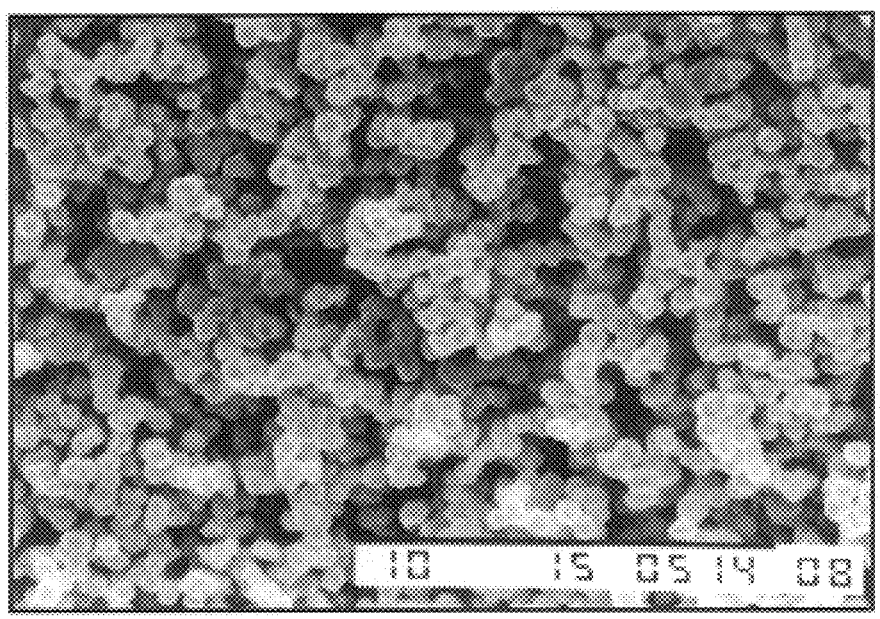
FIG. 3 is a scanning electron microscopic photograph (x 4900) of the α-alumina powder produced in Example 16.
Figure 4:
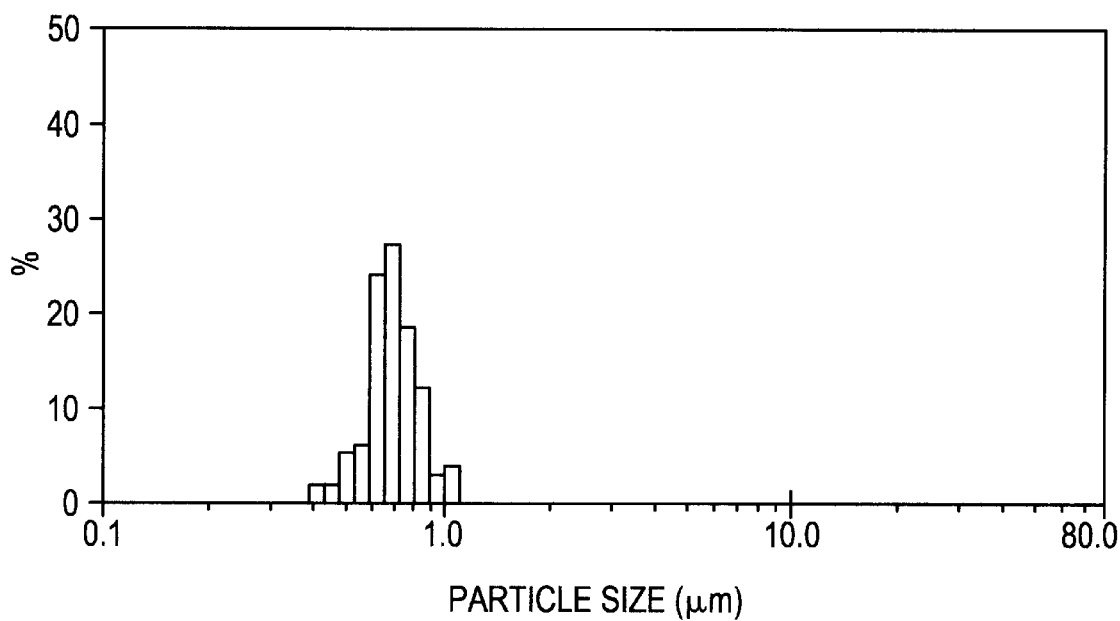
FIG. 4 shows a particle size distribution of the α-alumina powder produced in Example 16.
Figure 5A:
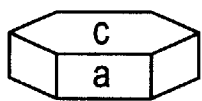
FIG. 5 shows the crystal habits of the α-alumina single crystal particle.
Figure 5B:
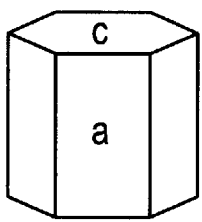
Figure 5C:
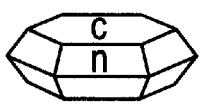
Figure 5D:
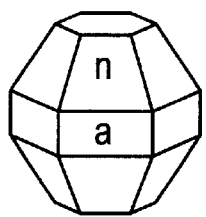
Figure 5E:
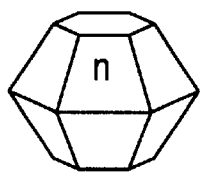
Figure 5F:
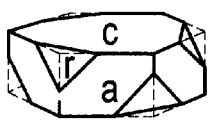
Figure 5G:
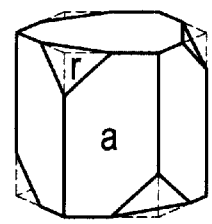
Figure 5H:
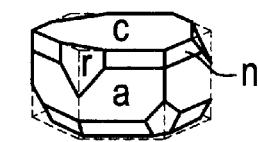
Figure 5I:
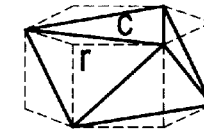

FIG. 3 is a scanning electron microscopic photograph of the α-alumina powder produced in Example 16, and FIG. 4 is a graph showing the particle size distribution of the α-alumina powder produced in Example 16.

EXAMPLE 17

In the same manner as in Example 13 except that the dechlorination was carried out by washing. α-alumina with water and drying it at 250° C. for 60 minutes, α-alumina powder was produced. The results are shown in Table 2.

EXAMPLE 18

The α-alumina powder obtained in Example 5 was soaked in water, heated in an autoclave at 180° C. for 2 hours and milled in a jet mill (PJM-100SP) under air pressure of 6 kg/cm$^2$ at a powder supply rate of 2.4 kg/hr to obtain desired α-alumina powder.

The results are shown in Table 2.

EXAMPLES 19–22

In the same manner as in Example 5 except that the composition of the atmosphere gas, the calcining temperature and the calcining time were changed as shown in Table 1, α-alumina powder was produced. The results are shown in Table 2.

COMPARATIVE EXAMPLE 1

The same aluminum hydroxide as used in Example 2 (200 g) was used as the starting alumina and calcined in the air in a cylinder furnace having a quartz muffle. The temperature was raised at a heating rate of 500° C./hr. After reaching 1100° C., that temperature was maintained for 30 minutes and then cooled spontaneously. But, the desired α-alumina powder was not produced. The results are shown in Table 2.

COMPARATIVE EXAMPLE 2

In the same manner as in Example 1 except that the remaining chlorine was not removed, α-alumina powder containing 310 ppm of chlorine was produced. The results are shown in Table 2.

EXAMPLE 23

Before the removal of chlorine, the same procedure as in Example 1 was repeated to obtain α-alumina powder.

The obtained α-alumina powder (about 1 g) was filled in an alumina crucible and calcined in vacuo to remove chlorine.

The crucible containing α-alumina powder was placed in an electric heater (an metal element furnace) at room temperature. After closing, the heater was evacuated by a rotary pump to about 0.1 Torr. and the temperature was raised at a heating rate of 5° C./min. up to 200° C. with evacuating the heater by the rotary pump. After reaching 200° C., that temperature and the pressure of 0.1 Torr were maintained for 2 hours. Thereafter, the temperature was decreased at a cooling rate of 20° C./min. to room temperature. The α-alumina powder contained 3 ppm of chlorine.

The production conditions and the results are shown in Tables 1 and 2, respectively.

EXAMPLE 24

Before the removal of chlorine, the same procedure as in Example 1 was repeated to obtain α-alumina powder.

The obtained α-alumina powder was heated in an autoclave at 180° C. for 2 hours to remove chlorine and the desired α-alumina powder was obtained. The chlorine content was 1 ppm.

The production conditions and the results are shown in Tables 1 and 2, respectively.

COMPARATIVE EXAMPLE 3

In the same manner as in Example 1 except that chlorine was not remove, the transition alumina was calcined to obtain α-alumina powder. The particle shape and particle size distribution of the α-alumina powder were good, but the α-alumina powder contained 48 ppm of chlorine.

EXAMPLE 25

The transition alumina (γ-alumina, AKP-G15) (200 g), the α-alumina powder (AKP-50) as the seed crystal (11.6 g) and isopropanol were mixed. Then, isopropanol was evaporated off.

The mixture of the transition alumina and the seed crystal (about 200 g) was filled in a cylinder furnace having a quartz muffle. The temperature was raised at a heating rate of 500° C./hr with flowing nitrogen gas. When the temperature reached 800° C., the bomb hydrogen chloride gas was supplied using nitrogen gas as a diluent gas. A concentration of hydrogen chloride in the furnace atmosphere was controlled by adjusting flow rates of the nitrogen gas and the hydrogen chloride gas by flow meters. The total flow amount of the atmosphere gas was adjusted to a linear velocity of 20 mm/min. A total pressure of the atmosphere gas was equal to the atmospheric pressure.

After reaching 1100° C., that temperature was maintained for 30 minutes and then cooled spontaneously.

The chlorine content in the obtained α-alumina powder was measured by the glow discharge mass spectroscopy to find that it was 310 ppm.

The obtained α-alumina powder (about 1 g) was filled in an aluminum crucible and calcined in vacuo to remove chlorine. The crucible containing α-alumina powder was placed in an electric heater (an metal element furnace) at room temperature. After closing, the heater was evacuated by a rotary pump to about 0.1 Torr. and the temperature was raised at a heating rate of 5° C./min. up to 1000° C. with evacuating the heater by the rotary pump. After reaching 1000° C., that temperature and the pressure of 0.1 Torr were maintained for 1 hour. Thereafter, the temperature was decreased at a cooling rate of 20° C./min. to room temperature to obtain the dechlorinated α-alumina powder.

The production conditions and the results are shown in Tables 1 and 2, respectively.

EXAMPLE 26

In the same manner as in Example 25 except that the chlorine gas was used in place of the hydrogen chloride gas, the transition alumina was calcined. The obtained α-alumina powder was milled in a jet mill under air pressure of 6 kg/cm$^2$ at a powder supply rate of 2.4 kg/hr and heated to remove chlorine under the same condition as in Example 25 to obtain desired α-alumina powder.

The production conditions and the results are shown in Tables 1 and 2, respectively.

COMPARATIVE EXAMPLE 4

The α-alumina particles, which were prepared by the hydrothermal method and had a particle size of 10 μm, had the crushing strength of 13 kg/mm$^2$.

TABLE 1

| Example No. | Starting material | Seed crystal | Shape-regulating agent | Atmosphere gas composition (vol. %) | | | | Calcining temp. (° C.) | Calcining time (min) | Milling step |
|---|---|---|---|---|---|---|---|---|---|---|
| | | | | HCl | Cl$_2$ | H$_2$O | N$_2$ | | | |
| 1 | Transition alumina | No | No | 30 | | | 70 | 1100 | 30 | No |
| 2 | Aluminum hydroxide | No | No | 30 | | | 70 | 1100 | 30 | No |
| 3 | Alum | No | No | 30 | | | 70 | 1100 | 30 | No |
| 4 | Aluminum sulfate | No | No | 30 | | | 70 | 1100 | 30 | No |
| 5 | Transition alumina | Yes | No | 30 | | | 70 | 1100 | 30 | No |
| 6 | ↑ | Yes | No | 30 | | | 70 | 1100 | 30 | Yes |
| 7 | ↑ | Yes | No | 30 | | | 70 | 1100 | 30 | Yes |
| 8 | ↑ | Yes | No | 100 | | | 0 | 600 | 90 | Yes |
| 9 | ↑ | Yes | No | | 100 | | 0 | 1200 | 30 | Yes |
| 10 | ↑ | Yes | No | | 30 | 5 | 65 | 800 | 90 | Yes |
| 11 | ↑ | No | Yes | 30 | | | 70 | 1100 | 30 | No |
| 12 | ↑ | Yes | Yes | 30 | | | 70 | 1100 | 30 | Yes |
| 13 | ↑ | Yes | No | 30 | | | 70 | 1100 | 30 | Yes |
| 14 | ↑ | Yes | No | 30 | | | 70 | 1100 | 30 | Yes |
| 15 | ↑ | Yes | No | 30 | | | 70 | 1100 | 30 | Yes |
| 16 | ↑ | Yes | No | 30 | | | 70 | 1100 | 30 | Yes |
| 17 | ↑ | Yes | No | 30 | | | 70 | 1100 | 30 | Yes |
| 18 | ↑ | Yes | No | 30 | | | 70 | 1100 | 30 | Yes |
| 19 | ↑ | Yes | No | 5 | | | 95 | 1100 | 180 | Yes |
| 20 | ↑ | Yes | No | 1 | | | 99 | 1100 | 600 | Yes |
| 21 | Transition alumina | Yes | No | 100 | | | 0 | 800 | 120 | Yes |
| 22 | ↑ | Yes | No | 100 | | | 0 | 900 | 30 | Yes |
| 23 | ↑ | No | No | 30 | | | 70 | 1100 | 30 | No |
| 24 | ↑ | No | No | 30 | | | 70 | 1100 | 30 | No |
| 25 | ↑ | Yes | No | 30 | | | 70 | 1100 | 30 | No |
| 26 | ↑ | Yes | No | | 30 | | 70 | 1100 | 30 | Yes |
| Com. 1 | Aluminum hydroxide | No | No | In air | | | | 1100 | 30 | No |
| Com. 2 | Transition alumina | Yes | No | 30 | | | 70 | 1100 | 30 | No |
| Com. 3 | ↑ | No | No | 30 | | | 70 | 1100 | 30 | No |

TABLE 2

| Ex. No. | Alpha-alumina powder Particle size (μm) | D/H | $D_{90}/D_{10}$ | Crystal habit | No. of faces | Removal of chlorine Atmosphere | Tem. (°C.) | Time (min) | Concentration of $Cl_2$ in α-alumina (ppm) | Alumina purity (wt. %) |
|---|---|---|---|---|---|---|---|---|---|---|
| 1 | 11 | 1 | 4 | G | 8 | Air | 600 | 30 | 4 | 99.96 |
| 2 | 14 | 1 | 3 | G | >20 | ↑ | 600 | 30 | 4 | >99.95 |
| 3 | 2 | 1 | 9 | | | ↑ | 600 | 30 | 10 | |
| 4 | 6 | 1 | 9 | | | ↑ | 600 | 30 | 8 | |
| 5 | 0.6 | 1 | 10 | | | ↑ | 600 | 30 | 33 | |
| 6 | 0.6 | 1 | 3 | | | ↑ | 600 | 30 | 32 | |
| 7 | 0.6 | 1 | 3 | | | ↑ | 600 | 30 | 32 | |
| 8 | 0.6 | 1 | | | | ↑ | 600 | 30 | 30 | |
| 9 | 0.6 | 1 | | | | ↑ | 600 | 30 | 30 | |
| 10 | 0.6 | 1 | | | | ↑ | 600 | 30 | 25 | |
| 11 | 11 | 1.2 | | C, H | 10–15 | ↑ | 600 | 30 | 8 | |
| 12 | 0.6 | 1.2 | | | | ↑ | 600 | 30 | 32 | |
| 13 | 0.6 | 1 | 3 | | | ↑ | 1000 | 60 | 4 | |
| 14 | 0.6 | 1 | 3 | | | ↑ | 900 | 60 | | |
| 15 | 0.6 | 1 | 3 | | | N2 | 1100 | 180 | 27 | |
| 16 | 0.6 | 1 | 3 | | | Vacuo | 1000 | 60 | 7 | |
| 17 | 0.6 | 1 | 3 | | | Washing with water and drying | | | 22 | |
| 18 | 0.6 | 1 | 3 | | | Treatment in autoclave | | | 19 | |
| 19 | 0.6 | 1 | 3 | | | Air | 600 | 30 | 27 | |
| 20 | 0.6 | 1 | 3 | | | ↑ | 600 | 30 | 35 | |
| 21 | 0.6 | 1 | 4 | | | Air | 600 | 30 | 26 | |
| 22 | 0.6 | 1 | 3 | | | ↑ | 600 | 30 | 32 | |
| 23 | 11 | 1 | | G | 18–20 | Vacuo | 200 | 120 | 3 | |
| 24 | 11 | 1 | | G | 18–20 | Autoclave | 180 | 120 | 1 | |
| 25 | 0.6 | 1 | 10 | F, H | >12 | Vacuo | 1000 | 60 | 7 | |
| 26 | 0.6 | 1 | | F, H | >12 | ↑ | 1000 | 60 | 7 | |
| C.1 | 0.1 | *1) | 13 | | | No dechlorination | | | N.M.*2) | |
| C.2 | 0.6 | 1 | | | | ↑ | | | 310 | |
| C.3 | 11 | 1 | | G | 18–20 | ↑ | | | 48 | |

Note:
*1)Nonuniform and the D/H ratio could not be measured.
*2)Not measured.

What is claimed is:

1. A method for producing α-alumina powder having a number average particle size of 0.1 to 30 μm and a halogen content of 10 ppm or less comprising the steps of:
   (i) calcining, in a calcining system, a starting material consisting of:
      (a) at least one additive, and
      (b) transition alumina, an alumina compound or mixtures thereof;
      in a halogen-containing atmosphere which comprises at least one member selected from the group consisting of a hydrogen chloride gas, a chlorine gas, and a mixture of a chlorine gas and steam; wherein said at least one hydrogen chloride gas, chlorine gas or chlorine gas in said mixture of chlorine gas and steam is present in an amount of at least 1% by volume based on the total volume in the atmosphere; and (ii) removing halogen from said calcined material;
   wherein said at least one additive is selected from the group consisting of a seed crystal and a shape-regulating agent, and wherein said halogen is removed by one of the following methods:
   a) a method in which α-alumina powder containing the halogen is heated in an atmosphere of air at a temperature of from 900° C. to 1000° C.; or
   c) a method in which α-alumina powder containing the halogen is heated under reduced pressure of 0.1 Torr or less at a temperature of from 400° C. to 1000° C.

2. The method according to claim 1, wherein said hydrogen chloride gas, chlorine gas or mixture of chlorine gas and steam is generated from at least one gas source selected from the group consisting of solid and liquid hydrogen chloride gas sources and solid and liquid chlorine gas sources in said calcining system.

3. The method according to claim 1, wherein:
   (i) at least one gas source selected from the group consisting of solid and liquid hydrogen chloride gas sources and solid and liquid chloride gas sources is mixed with at least one of the starting material defined as said component (b); and then
   (ii) the mixture is supplied to the calcining system.

4. The method according to claim 1, wherein a calcining temperature is from 600° C. to 1400° C.

5. The method according to claim 2 or 3, wherein said hydrogen chloride gas source is an ammonium chloride.

6. The method according to claim 1, wherein said seed crystal is at least one compound selected from the group consisting of compounds of aluminum, titanium, vanadium, chromium, iron and nickel.

7. The method according to claim 1, wherein said shape-regulating agent is at least one material selected from magnesium, calcium, strontium, yttrium, zirconium, niobium, vanadium, molybdenum, copper, zinc, boron, silicon, lanthanum, cerium, neodymium, and compounds thereof.

8. The method according to claim 1, wherein said starting material is calcined in at least 1.0% by volume of said hydrogen chloride gas at a temperature of from 500° C. to 1400° C.

9. The method according to claim 1, wherein said starting material is calcined in at least 1.0% by volume of said chloride gas at a temperature of from 950° C. to 1500° C.

10. The method according to claim 1, wherein said starting material is calcined in at least 1.0% by volume of said chloride gas and at least 0.01% by volume of steam at a temperature of from 500° C. to 1400° C.

11. The method according to claim 1, wherein the α-alumina powder has a number average particle size of 0.1 to 1 μm.

12. A method for producing α-alumina powder having a number average particle size of 0.1 to 30 μm and a halogen content of 40 ppm or less comprising the steps of: (i) calcining, in a calcining system, a starting material consisting of:
  (a) at least one additive, and
  (b) transition alumina, an alumina compound or mixtures thereof;

in a halogen-containing atmosphere which comprises at least one member selected from the group consisting of a hydrogen chloride gas, a chlorine gas or a mixture of a chlorine gas and steam; wherein said at least one hydrogen chloride gas, sack chlorine gas or chlorine gas in said mixture of chlorine gas and steam is present in an amount of at least 1% by volume based on the total volume in the atmosphere; and (ii) removing halogen from said calcined material;

wherein said at least one additive is selected from the group consisting of a seed crystal and a shape-regulating agent, and wherein said halogen is removed by one of the following methods:

a) a method in which α-alumina powder containing the halogen is heated in an atmosphere of air at a temperature of from 550° C. to 1000° C., b) a method in which α-alumina powder containing the halogen is heated in an inert gas atmosphere at a temperature of from 600° C. to 1100° C., and c) a method in which α-alumina powder containing the halogen is heated under reduced pressure of 0.1 Torr or less at a temperature of from 400° C. to 1000° C.

* * * * *